Nov. 3, 1970   K. M. MURGAS ET AL   3,537,787

PHOTOCOPY REPRODUCTION SYSTEM

Filed Sept. 18, 1967   5 Sheets-Sheet 1

INVENTORS
KARL M. MURGAS
BURTON GREENBERG
BY OTTO A. CLARK

*Robert L. Slater Jr.*
ATTORNEY

INVENTORS
KARL M. MURGAS
BURTON GREENBERG
BY OTTO A. CLARK

*Robert L. Slater Jr*
ATTORNEY

Nov. 3, 1970    K. M. MURGAS ET AL    3,537,787
PHOTOCOPY REPRODUCTION SYSTEM
Filed Sept. 18, 1967    5 Sheets-Sheet 5
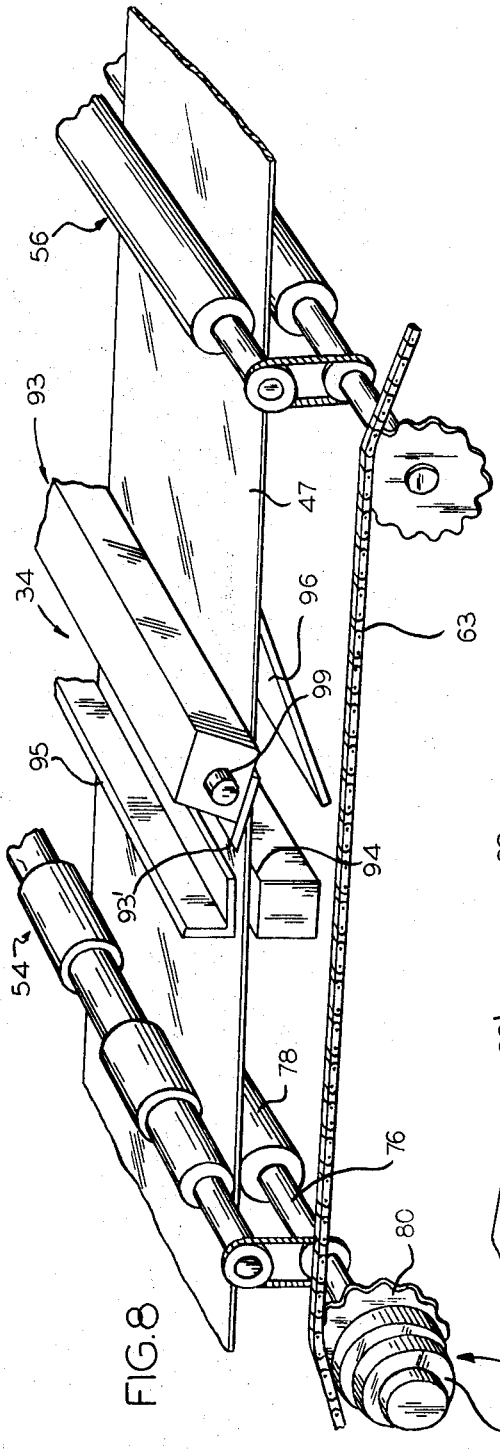
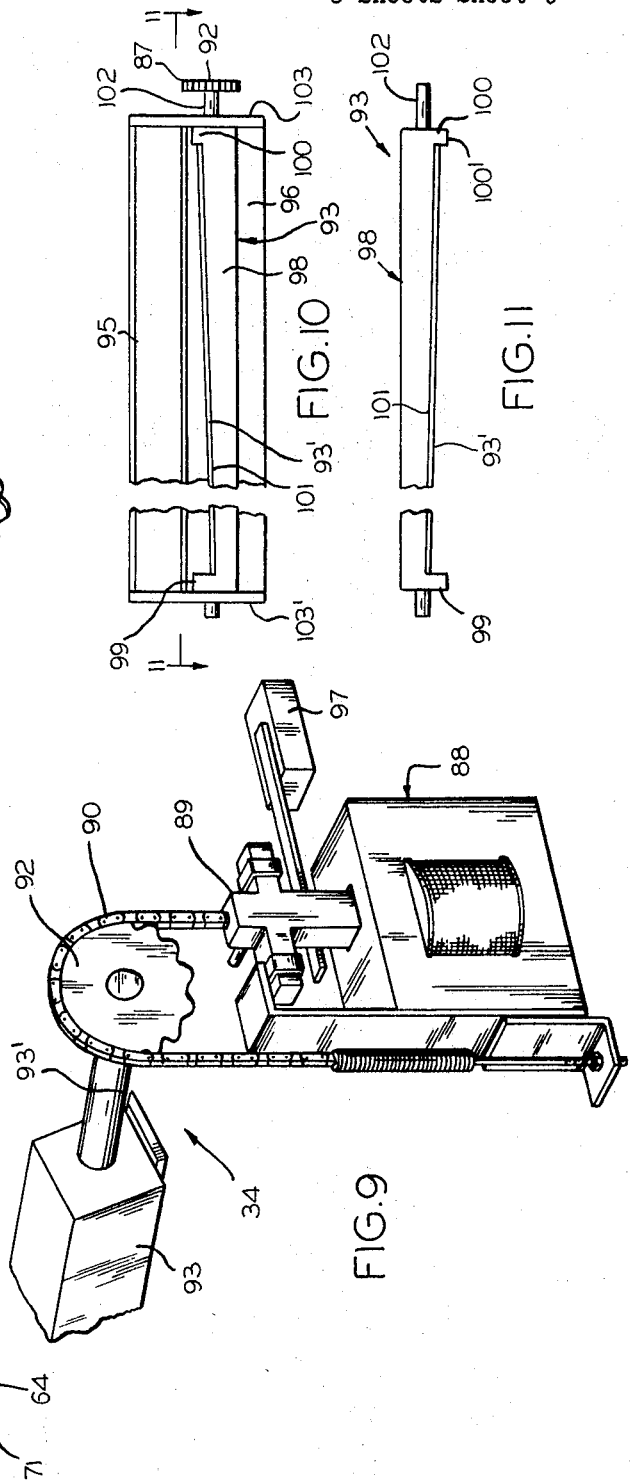
INVENTORS
KARL M. MURGAS
BURTON GREENBERG
OTTO A. CLARK
BY
Robert L. Slater Jr.
ATTORNEY

3,537,787
PHOTOCOPY REPRODUCTION SYSTEM
Karl M. Murgas, Lincolnwood, and Burton Greenberg and Otto A. Clark, Chicago, Ill., assignors to ICP, Inc., Skokie, Ill., a corporation of Illinois
Filed Sept. 18, 1967, Ser. No. 668,543
Int. Cl. G03b 27/58
U.S. Cl. 355—29   10 Claims

ABSTRACT OF THE DISCLOSURE

A photocopy machine having an original document transport system and a copy paper transport system for reproducing a moving document onto a simultaneous moving photosensitive copy paper. A first feed means initially pulls copy paper into the copy paper pathway and a second feed means spaced therefrom receives the copy paper from the first feed means. A knife means disposed between the first and second feed means severs a length of copy paper after the original has been copied thereon. Means are provided to decouple the drive means from the first feed means after the copy paper is received by the second feed means and before the knife means has severed the copy paper, so that the second feed means controls the pulling of the copy paper past the first feed means and the knife means. The second feed means pulls the copy paper taut when the knife means contacts the copy paper just prior to severing the copy paper, and thereby enabling the copy paper to be sharply cut away from the copy paper supply.

BACKGROUND OF INVENTION

The present invention relates generally to a photocopy reproduction system for photocopy devices including electrostatic photocopy machines, and more particularly relates to the cooperation of the primary elements comprising a photocopy device to provide a desired sequence of operation. Still more particularly, the invention relates to a means for providing a clean and sharp severing of a length of copy paper from the copy paper supply.

Electrostatic photocopy devices are commonly constructed to pass a specially coated and electrostatically charge sheet of copy paper through the focal plane of an optical camera system. The original document which is to be copied is positioned before the camera objective lens. The image of the document is transferred through the optical camera system and onto the sensitized surface of the copy paper. The exposed or imprinted sensitive surface of the copy paper is then passed through a fluid suspension of ink particles suitably charged to react irreversibly with the electrostatically charged image borne upon the copy paper surface.

It is both technically inconvenient and costly to view at one instant an entire original document page through an objective lens in a copy machine camera system in order to transfer at one instant the image of the entire document sheet to the sensitized copy paper. To view at one instant an entire sheet of an original document requires an exceptionally wide angle lens and large optical elements having inconveniently long focal lengths. This arrangement is further undesirable by the possible loss of resolution and edge distortion of the image transferred to the copy paper. Also, the cost of the optical components required for viewing a large area instantaneously are appreciably greater than the cost of optical components designed for viewing a relatively smaller area.

Previous photocopy machines avoided designs that require wide angle optical components, for instance, by passing the original document borne on a moving carriage before the objective lens of a moving camera system. The movement of the carriage was coordinated with movement of the camera system as a whole, while the sensitized copy paper was held fixed in the camera focal plane and the image projected onto it in successive increments as the carriage moved past. Alternately, the original document was fixedly placed face down on a transparent glass plate while the camera system and a sheet of sensitized copy paper held in the focal plane of the camera was moved beneath the original document and the image thereon transferred by successive small increments onto the sensitized copy paper. The moving carriage required substantial space and mechanical complexity, and therefore photocopy machines so equipped were likely to be bulky in size, heavy and inherently slow. Moreover, the moving carriage was not capable of being rapidly accelerated and was required to be returned after each cycle to a starting position before the next print cycle was initiated.

A lighter, smaller and more rapid print cycle photocopy machine may be constructed if the original document is transported before the objective lens of the copy machine camera, and simultaneously sensitized copy paper is moved in the camera focal plane at a direction and speed coordinated with the changing image transferred through the camera optical system.

In many of the rapid cycle photocopy machines, the copy paper was dispensed from a roll or continuous sheet of copy paper. Generally these machines were incapable of providing a sharp severing of a length of the photocopy paper from the roll. Therefore, the cut edge was jagged and irregularly shaped. Aside from the unsightly appearance of the reproduced copies, their rough edges frequently caused the copies to catch or jam in the transport system. The inadequate cutting capability of the prior photocopy machines was attributed primarily to insufficient tautness of the copy paper prior to the severing operation. Generally, these machines continued feeding until the actual severing of the copy paper occurred which appreciably contributed to the slack in the copy paper.

SUMMARY OF THE INVENTION

The present invention provides a system of operation for reproducing increments of a movable original document onto a length of simultaneously moving sensitized paper.

A copy paper feed means is provided to cooperate with a knife means and hold the copy paper tautly in position prior to the severing of a length of copy paper from a roll or supply of copy paper. Thus, the length of paper is severed sharply and cleanly away from the roll and without any rough or irregular edges.

A primary object of our invention, accordingly, is to provide an improved reliable photocopy device for reproducing increments of a moving document onto a simutaneously moving length of sensitized paper.

Another object is to provide a reliable copy paper transport system.

Another object is to provide means for automatically severing a length of copy paper sharply and cleanly from a supply of copy paper stored in the machine.

Still another object is to provide a copy paper feed means to cooperate with a knife means and hold the copy paper tautly in position prior to the severing of a length of copy paper.

Still another object is to prevent slack from developing in the copy paper prior to cutting. A related object is to prevent overfeed in the copy paper prior to cutting.

These and other objects and advantages of the invention will become apparent from the illustrations in the accompanying drawings and the following specification and claims.

BRIEF DESCRIPTION OF THE DRAWINGS

Referring to the drawings in which the same characters of reference are employed to indicate corresponding or similar parts throughout the several figures of the drawings.

FIG. 8 is a fragmentary perspective view similar to FIG. 7 and showing the knife means without the side mounting brackets for convenience of illustration;

FIG. 9 is a fragmentary perspective view of the knife solenoid and associated elements;

FIG. 10 is an enlarged top view of the knife means; and

FIG. 11 is a front view taken on the plane of the line 11—11 in FIG. 10, viewed in the direction indicated, and showing the movable knife assembly.

DESCRIPTION OF THE PREFERRED EMBODIMENT

Figure 1:
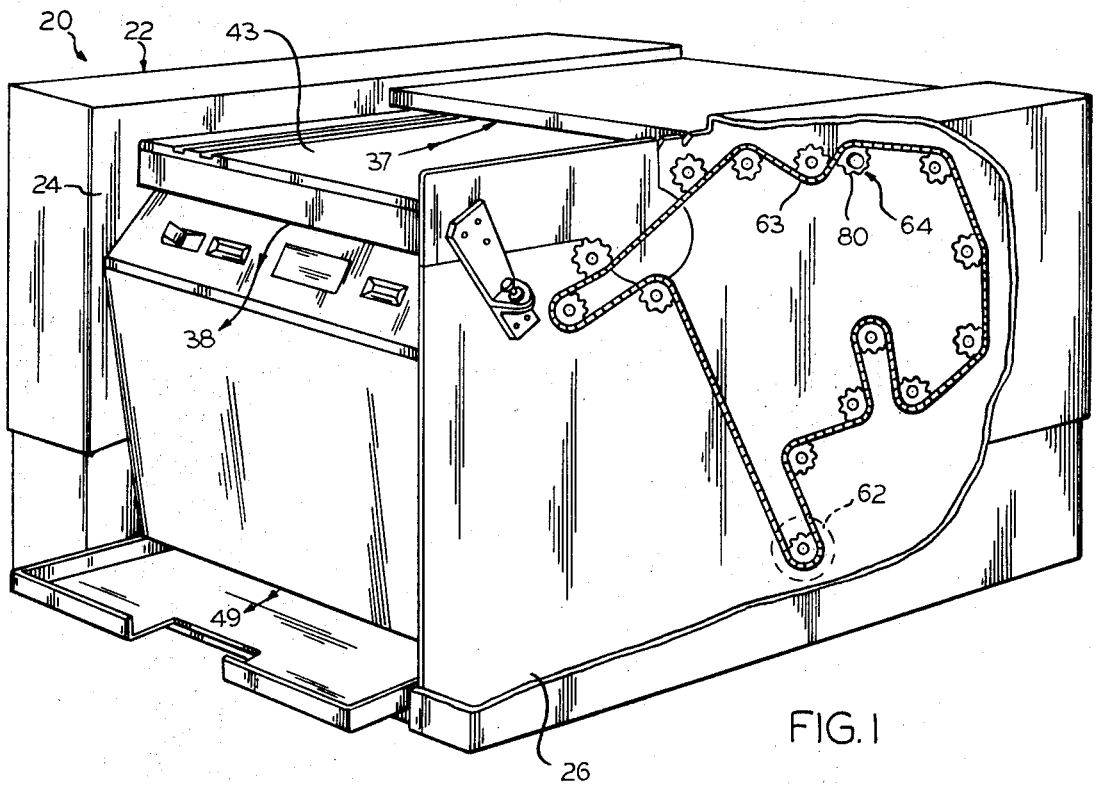
FIG. 1 is a perspective view of a photocopy machine embodying the principles of the invention, with portions cut away to show the drive means for rotating the cooperating sets of rollers of the original document and copy paper transport systems.
Figure 3:
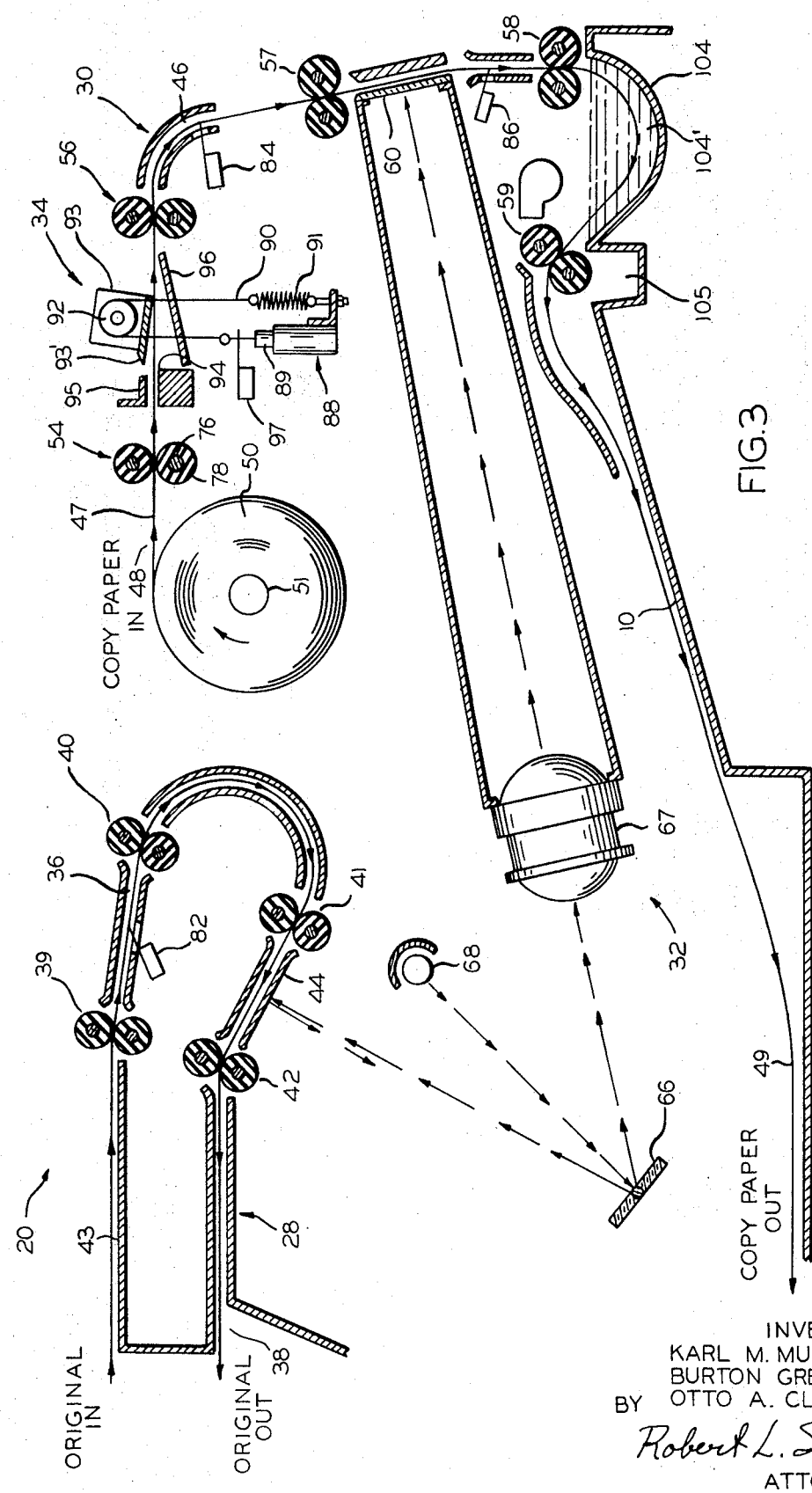
FIG. 3 is an enlarged sectional mechanical schematic view of the photocopy machine in FIG. 1.

Referring now to FIGS. 1 and 3 of the drawings, the reference numeral 20 indicates generally a photocopy reproduction machine embodying the principles of the invention. The photocopy machine 20 comprises a substantially rectangular frame 22 having a pair of parallel spaced sidewalls 24, 26. The photocopy machine 20 comprises an original document transport system 28, a copy paper transport system 30, a stationary camera means 32 and a knife means 34.

The original document transport system 28 comprises a pathway 36 for transporting the original document from an input 37 to an output 38. A plurality of pairs of cooperating rollers indicated generally by the reference numerals 39, 40, 41 and 42 are spaced apart within the pathway 36 and move the original document between the input 37 and output 38. The document is initially properly positioned on a feed tray 43 before being manually inserted into the machine.

A transparent glass section 44 is positioned in the pathway 36 between the cooperating roller pairs 41 and 42. The image of an increment or portion of the document moving across the glass section 44 is transferred to the camera means 32. The original document transport system 28 is more fully described in our copending patent application entitled An Original Document Transport System for a Photocopy Machine.

The copy paper transport system 30 (FIG. 3) comprises a pathway 46 for transporting photosensitive copy paper 47 from an input 48 to an output 49. The copy paper 47 is stored in a roll 50 supported on a spindle 51.

A first pair of cooperating input feed rollers 54, a second pair of cooperating input feed rollers 56 and cooperating pairs of rollers indicated respectively by the numerals 57, 58 and 59 are spaced apart from each other in pathway 46 and move the copy paper 47 between the input 48 and output 49.

Initially the first pair of cooperating feed rollers 54 (FIGS. 3, 4, 6, 7 and 8) pulls the copy paper 47 off the roll 50, past the knife means 34 and into the grip of the second pair of cooperating feed rollers 56. As will be described later, the power driving the first feed rollers 54 is removed sometime after the copy paper is gripped by the second feed rollers 56 but prior to the severing of the copy paper.

A transparent glass section 60 is positioned in the copy paper pathway 46 (FIG. 3) between rollers 57 and 58. The image of the original document moving across glass section 44 is conveyed by the camera means 32 onto the photocopy paper moving across the glass section 60.

A motor 62 (FIG. 1) drives a continuous, revolving drive chain 63. The roller pairs 39, 40, 41 and 42 of the original document transport system 38 and the roller pairs 56, 57, 58 and 59 of the copy paper transport system are continually and simultaneously driven by the chain 63 at substantially the same rate of speed.

The first feed rollers 54 are driven by the chain 63 for only a brief interval of a photocopy operating cycle, to enable the copy paper 47 to be gripped by the second feed rollers 56. A clutch means indicated generally by the numeral 64 (FIGS. 4, 6 and 8) controls the linkage of the first feed rollers 54 with the drive chain 63, which will be more fully explained later in the description.

The camera means 32 comprises a reflecting mirror 66 (FIG. 3) positioned to receive the image of the original document moving across the glass section 44 and reflects the image into the focal plane of an objective lens 67.

The objective lens 67 focuses the image of the original document onto the photosensitive copy paper 47 moving across the glass section 60. The image reflection and sharpness of the photocopy is controlled by the light beamed to the mirror 66 from a high intensity lamp 68.

Figure 4:
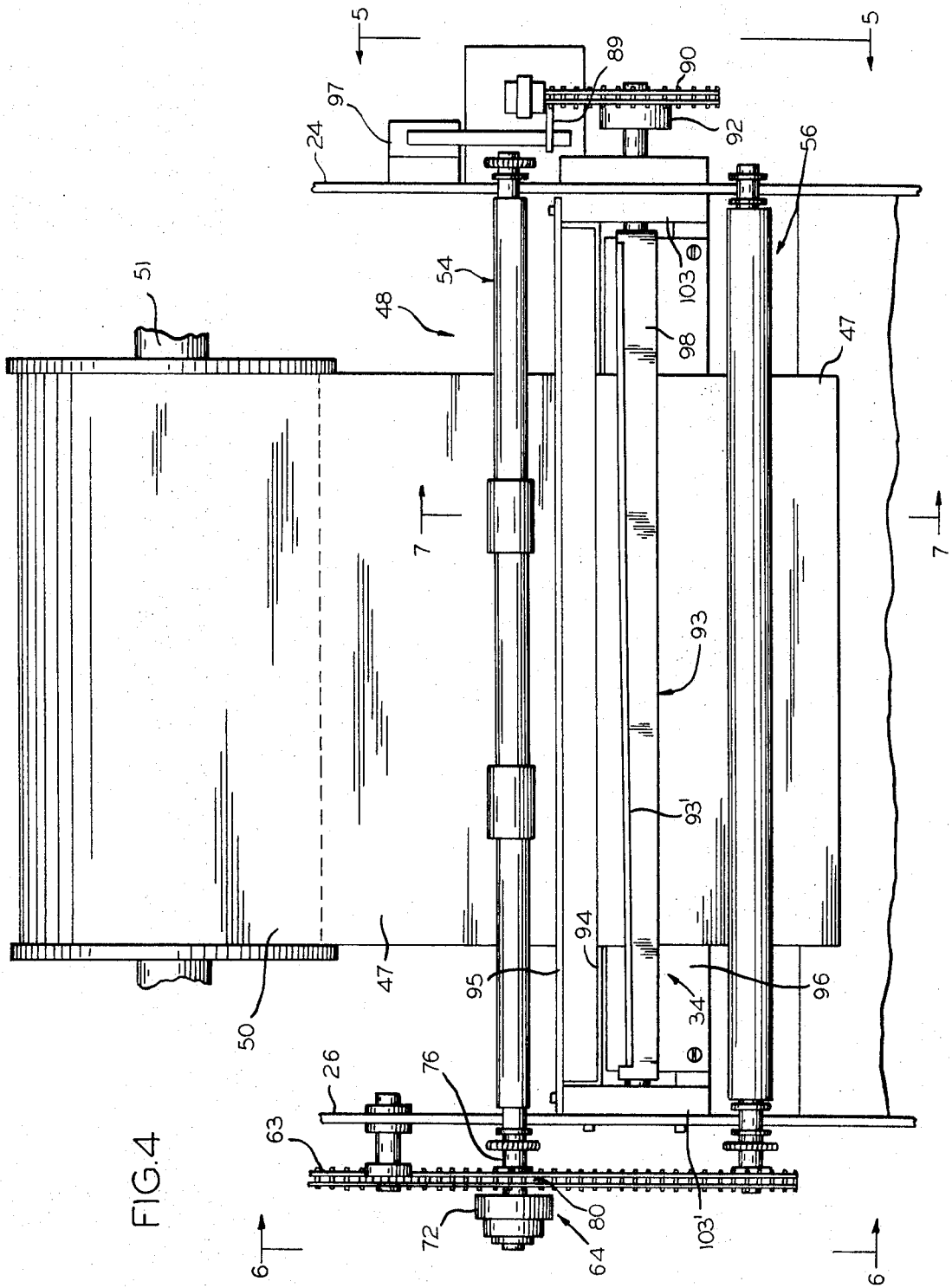
FIG. 4 is an enlarged fragmentary top view of the knife means and the elements of the copy paper transport system adjacent the copy paper roll.
Figure 5:
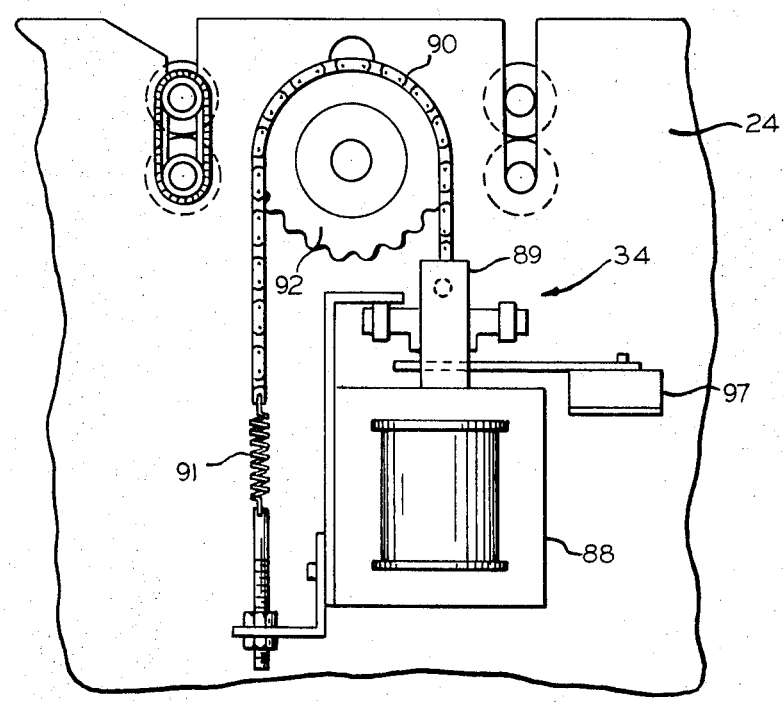
FIG. 5 is a fragmentary side view taken from the plane of the line 5—5 in FIG. 4, viewed in the direction indicated, and showing the knife solenoid and associated element for operating the movable knife.
Figure 6:
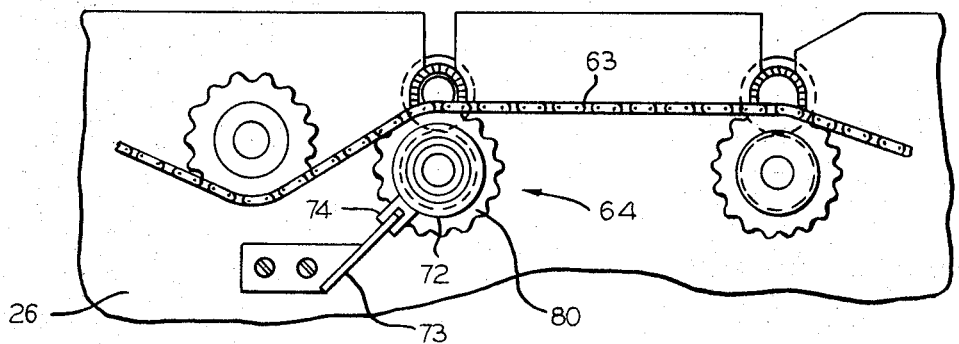
FIG. 6 is a fragmentary side view taken from the plane of the line 6—6 in FIG. 4, viewed in the direction indicated, and showing the clutch means and associating elements for controlling the operation of the copy paper feed rollers.

The clutch means 64 comprises an electromagnet 71 (FIG. 2) enclosed within a housing 72 (FIGS. 4, 6 and 8). A bracket member 73 (FIG. 6) is rigidly mounted to sidewall 26 and is received within an accommodating slot formed in a protuberance 74 extending outward from housing 72 to securely associate the housing 72 to the sidewall 26.

The energizing of the electromagnet 71 of the clutch means 64 causes a mechanical linking of a shaft 76 (FIGS. 4 and 8) of the drive roller 78 of the feed rollers 54 to a sprocket 80. The teeth of the sprocket 80 engage the drive chain 63 (FIGS. 6 and 8) and the sprocket rotates with the chain. When the electromagnet 71 is energized the clutch means 64 locks the sprocket 80 to the drive roller 78 causing the first feed means 54 to rotate. This enables the first feed rollers 54 to pull the copy paper 47 from the roll 50 past the knife means 34 and into the grip of the second feed rollers 56.

A control switch 82 (FIGS. 2 and 3) is positioned inward from the input rollers 39 of the original document transport system 28 and is switched to an on-position by the leading edge of an original document. In the on-position, switch 82 causes the energizing of the electromagnet 71 (FIG. 2) of the clutch means 64 and the energizing of a knife relay 83 which sets the knife means 34 in a "go" or ready condition.

The leading edge of the copy paper moves an exposure switch 84 (FIGS. 2 and 3) to an on-position. When switch 84 is in the on-position, a light relay 85 is energized and simultaneously the electromagnet 70 for the clutch means 64 is de-energized. Therefore, the movement of the copy paper 47 of the roll 50 is now controlled solely by the second feed rollers 56.

The energized light relay 85 turns on a high voltage power supply 86 which activates the photosensitive paper 47 and the high intensity lamp 68. The exposure switch 84 is switched on before the leading edge of the copy paper reaches the glass section 60.

A hold switch 87 is switched to an on-position after the leading edge of the copy paper has moved across the glass section 60. Switch 86 remains in its on-position and maintains the lamp 68 "on," until the entire length of the original document has been copied onto the copy paper 47. Therefore, when the trailing edge of the copy paper 47 passes the hold switch 86, the hold switch returns to its off-position to cause the turn off of the lamp 68. This occurs after the length of copy paper is severed from the roll 50.

When the trailing edge of the original document moves past the control switch 82, the control switch 82 automatically returns to its off-position. This causes the knife means 34, previously placed in the ready condition when the knife relay 83 was energized, to sever a length of the copy paper having substantially the equivalent length as the original document.

Figure 2:
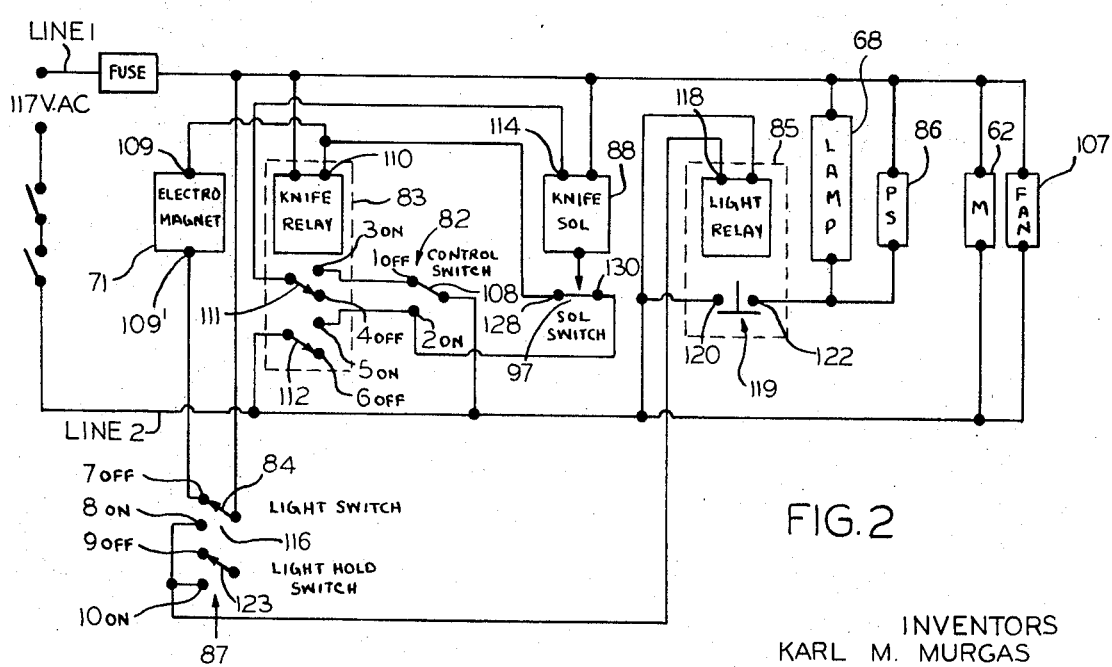
FIG. 2 is an electrical schematic layout and showing the switching arrangement for controlling the primary elements of the photocopy machine.
Figure 7:
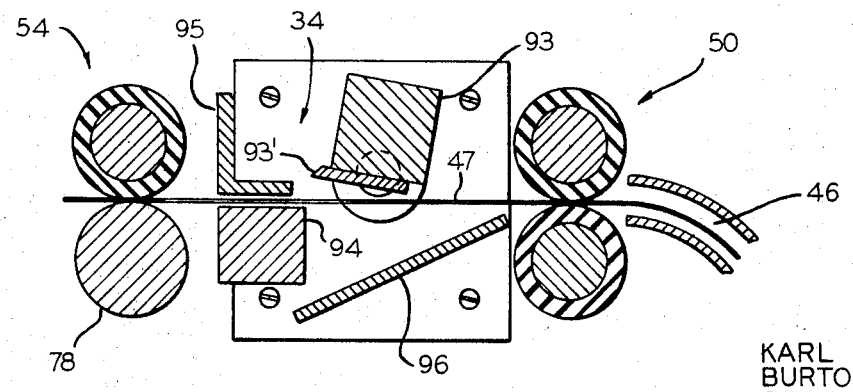
FIG. 7 is an enlarged fragmentary sectional view showing the knife means and the adjacent copy paper rollers.

The knife means 34 comprises a knife solenoid 88 (FIGS. 2, 3, 5 and 9) which is energized when the control switch 82 is switched from its on-position to its off-position (FIG. 2). When solenoid 88 is energized, it pulls a plunger 89 downward causing a chain member 90 to move against the restraining force of a spring 91. The chain member 90 causes a sprocket or gear 92 to rotate, which in turn, rotates a movable blade assembly 93 (FIGS. 7, 8 and 9) having a knife blade 93′ toward a stationary blade 94 for severing the length of copy paper 47 from the roll 50 (FIGS. 7 and 8).

Since the first feed rollers 54 are not being driven by the drive chain 63 during the severing operation, the copy paper is held taut by the pulling force from the second feed rollers 56 and the restraining force from the movable blade 93′ bending the copy paper 47 downward against the edge of the stationary blade 94. The restraining force from the knife means 34 also prevents the second feed rollers 56 from pulling additional copy paper 47 off the roll 50. In this manner, overfeed of the copy paper and a build-up of slack in the copy paper adjacent the cutting area, are prevented. Consequently, when the copy paper is severed, a clean and sharp cut is made.

A substantially right angled elongated guide bracket 95 (FIGS. 7, 8 and 10) is positioned above the stationary blade 94. A lower inclined guide member 96 having a lower edge below the cutting blades 93′, 94, inclines upward toward the second feed rollers 56. The inclined guide member 96 directs the leading edge of the copy paper 47 pulled by the first feed rollers 54 into the grip of the second feed rollers 56. The right-angled guide bracket 95, the inclined guide member 96, the stationary blade 94 and movable blade assembly 93 cooperate and prevent the copy paper from straying away from the desired path of movement.

A solenoid switch 97 (FIGS. 2, 5 and 9) is switched to an open-position by the plunger 89 moving downward when the solenoid 88 is energized. This opens the line 2 connection to the knife relay 83 which causes the de-energizing of the knife relay 83, which in turn causes the de-energizing of the knife solenoid 88. When the knife solenoid 88 is de-energized, the resilient force of spring 91 pulls the chain member 90 downward and the sprocket 92 rotates pulling the plunger 89 upward. The rotation of the sprocket 92 causes the rotation of the movable knife assembly 93 back to its original or non-operative position.

The movable blade assembly 93 (see FIGS. 8 to 11) comprises an elongated cradle 98 with opposed ears 99, 100 at the opposite ends thereof. As shown in FIG. 11, an inclined surface 101 of cradle 98 is inclined from ear 99 to the outer end 100′ of ear 100. The knife blade 93′ is rigidly mounted on the inclined surface 101. A stub 102 (FIGS. 8 and 9) extends outward from ear 100 and the outer end thereof is attached to the sprocket 92. Knife blade 93′ is angled with respect to the rotating plane passing through stub 102.

The movable knife 93, the stationary knife 94, the right angled bracket 95 and inclined bracket 96 are secured to a side support member 103 adjacent the sprocket 92 and an opposed side support member 103′. For convenience of illustration, the side support members 103, 103′ were removed from FIG. 8. The knife blade 93′, due to its inclined mounting on surface 101, moves through an increasing arcuate length or distance from stub 102 toward the ear 99 as stub 102 rotates.

The camera means 32 (FIG. 3) transfers the images of the portions of the original document passing across the glass section 44 onto the portions of copy paper 47 passing across the glass section 60. The exposed copy paper 47 then passes through a receptacle 104 containing a toner solution 104′. The receptacle 104 has a toner overflow section 105. The toner solution 104′ develops the exposed copy paper. The output roller set 59 transfers the copy paper 47 to a slide 106 leading to the copy paper output 49.

A fan 107 shown in the schematic of FIG. 2 internally cools the parts of the photocopy machine 20 to insure reliable operation.

Turning now specifically to FIG. 2, the sequence of the photocopy operation will now be described with reference to the electrical system of the photocopy machine 20. FIG. 2 shows the various switching components in their non-operative positions prior to the commencing of the photocopy operation.

When the original document is inserted into the machine, the leading edge switches the control switch 82 to its on-position, whereby the movable arm 108 of the switch 82 moves from terminal 1 to terminal 2 or from the off to the on position. This applies line 2 voltage of the 117 v. AC which is connected to movable arm 108, to point 109 of the electromagnet 71 of the clutch means 64 and to point 110 of the knife relay 83. The electromagnet 71 becomes energized since the opposite side 109′ is connected to line 1 of the 117 v. AC line through exposure switch 84, causing the drive chain 63 to power the first feed rollers 54.

The knife relay 83 is also energized from control switch 82 and goes from a non-operative or no-go position to a knife go-position, whereby the movable arm 111 switches from terminal 4 (off) to terminal 3 (on) and movable arm 112 switches from terminal 6 (off) to terminal 5 (on). Point 114 of the knife solenoid 88 is connected through movable arm 111 to terminal 1 of the control switch 82. Terminal 2 of the control switch 82 is connected to the line 2 voltage through the movable arm 112. Note, that terminal 2 of the control switch 82 is also connected to the line 2 voltage through the movable arm 108.

When the leading edge of the copy paper 47 switches the exposure switch 84 to the on-position, the movable arm 116 switches from terminal 7 or the off-position into contact with terminal 8 or the on-position. This severs the connection of line 1 voltage of the 117 v. AC to point 109′ of the electromagnet 71 of the clutch means 64 to de-energize the electromagnet, and connects line 1 voltage of the 117 v. AC to point 118 of the light relay 85 to energize the light relay 85. Therefore, when the light switch 84 is in the on-position, the first feed rollers 54 disengage from the drive chain 63 due to the de-energizing of the electromagnet 71, and the second feed rollers 56 control the pulling of the copy paper 47 from the roll 50.

Upon the energizing of the light relay 85, a movable contacting bar 119 connects a point 120 to a point 122, and thereby applies line 2 voltage to the high voltage power supply 86. This turns on the high intensity lamp 68.

After the leading edge of the copy paper passes the glass section 60, the hold switch 87 is moved to its on-position, whereby the movable arm 123 moves from terminal 9 to terminal 10. Therefore, point 118 of the light relay 85 is connected to the line 1 voltage through the exposure switch 84 and hold switch 87.

When the trailing edge of the copy paper 47 passes the exposure switch 84, the movable arm 116 moves from terminal 8 back to terminal 7. Due to the hold switch 87, the lamp 68 still remains "on."

When the trailing edge of the original document moves past the control switch 82, switch 82 returns to its off-position as the movable arm 108 switches from terminal 2 back to terminal 1. Point 114 of the knife solenoid 88 is now connected to the line 2 voltage through movable arm 111 of the knife relay 83 and movable arm 108 of the control switch 82. This energizes the knife solenoid 88 which rotates the movable blade assembly 93 to sever the length of copy paper 47 from the roll 50.

The inward movement of the plunger 89 of the knife solenoid 88 mechanically moves the solenoid switch 97 downward which opens the connection between points 128 and 130 and electrically disconnects line 2 voltage from point 110 of knife relay 83. This de-energizes the knife relay 83 and movable arms 111, 112 return respectively to terminals 4 and 6.

When the trailing edge of the length of copy paper 47 moves past the hold switch 87, the movable arm 123 switches from terminal 10 back to terminal 9 to disconnect line 1 voltage to point 118 of the light relay 85. This de-energizes the light relay 85 and the lamp 68 switches off. The copy paper with the image of the original imprinted thereon, passes through the toner solution and slides downward to output 49.

From the drawings and foregoing description, it should be apparent that a novel photocopy reproduction system has been provided which accomplishes the aforestated objects in an efficient and improved manner. By providing a first feed means 54 to pull the copy paper from the roll 50, past the knife means 34 until gripped by the second feed means 56 and then disconnecting the power drive from the first feed means, a sharp and clean severing of the length of copy paper from the roll is consistently achieved. This is due mainly to the tautness in the copy paper caued by the pulling force from the second feed means against the restraining force applied by the knife means during the cutting operation. Therefore, the sharp cut provided by this invention eliminates the frayed and jagged edges that often caused jamming of the copy paper in the copy paper pathway.

Moreover, the sequence of system operation, affords a reliable system operation for reproducing the original document moving through the original document transport system onto the photosensitive copy paper moving through the copy paper transport system.

The description of the preferred embodiment of this invention is intended merely as illustrative of this invention, the scope and limits of which are set forth in the following claims.

We claim:

1. In a reproduction apparatus including a supply of copy paper, an original document transport system for transporting an original document through a pathway, a copy paper transport system for transporting copy paper through a second pathway, means for reproducing the original document onto said copy paper, said copy paper transport system comprising:
   a first feed means for pulling the copy paper from the supply into said second pathway;
   a second feed means to receive the copy paper from the first feed means;
   a knife means positioned between the first and second feed means to cut a length of copy paper from the supply;
   power means for driving said first and second feed means;
   a first switch means having an on-position and an off-position, the leading edge of the original document switching the first switch means from the off to the on position to cause said power to couple to said first feed means; and
   a second switch means having an operative position to cause said power means to decouple from said first feed means, the leading edge of the copy paper switching the second switch means to the operative position.

2. The reproduction apparatus of claim 2 wherein:
   said power means comprises a continuous rotating chain, said second feed means being coupled to and driven by said chain;
   said first feed means comprises at least one roller with a shaft;
   a sprocket associated with said shaft and caused to rotate by said chain; and
   a clutch means coupling the shaft of said first feed means to said sprocket to cause rotation of said roller when said first switch means switches into the on-position, said clutch means decoupling the shaft from the sprocket when the second switch means switches into the operative-position, thereby removing power drive from the power means to the first feed means.

3. In a reproduction apparatus including a supply of copypaper, an original document transport system for transporting an original document through a pathway, a copy paper transport system for transporting copy paper through a second pathway, reproducing means for reproducing the original document onto said copy paper, said copy paper transport system comprising:
   a first feed means for pulling the copy paper from the supply into said second pathway;
   a second feed means to receive the copy paper from the first feed means;
   a knife means positioned between the first and second feed means to cut a length of said copy paper from the supply, said knife means being movable to a cutting position from a non-cutting position;
   power means for driving said first and second feed means;
   means for coupling said power means to said first feed and means for decoupling said power means from said first feed means after said second feed means has received the copy paper and before said knife means has severed said length of copy paper, said second feed means pulling the copy paper into the second pathway after the decoupling of said first feed means from the power means;
   a first switch means having an on-position and an off-position, the leading edge of the original document switching the first switch means from the off to the on-position to cause said power means to couple to said first feed means; and
   a second switch means having an operative-position to cause said power means to decouple from said feed means, the leading edge of the copy paper causing the second switch means to be switched to the operative-position after the second feed means has received the copy paper and before said knife means has severed the copy paper from the supply, said knife means providing a restraining force against the copy paper when moving toward said cutting position and preventing the second feed means from pulling more copy paper from the supply, whereby the cooperation of the pulling force from the second feed means and the restraining force from the knife means maintains the copy paper taut between the second feed means and the knife means prior to the severing of the length of copy paper from the supply.

4. The reproduction apparatus of claim 3, wherein:
   a knife "go" switch having a no-go position and a go-position, said "go" switch being switched from the no-go to the go-position when said first switch means is switched into the on-position, said knife means moving from the non-cutting to the cutting position for severing said length of material after the trailing edge of the original document has moved past the first switch means to enable the first switch means to return to the off-position.

5. The reproduction apparatus of claim 4, wherein said knife means comprises:
a movable blade means;
a solenoid activating a movable plunger when energized, said solenoid being energized when said first switch means returns to the off-position after said "go" switch means is in the go-position;
a gear member associated with the movable blade;
a chain segment engaging said gear member, one end of the chain segment being attached to the plunger; and
a resilient member connected to the opposite end of the chain segment, said plunger pulling said chain segment against the restraining force of the resilient member when said solenoid is energized and thereby rotating said gear member to cause the rotating of the movable blade from the non-cutting position toward the cutting position.

6. The reproduction apparatus of claim 5, wherein:
a switch member is associated with said knife means, said switch member having a normally closed-position and an open position, the severing of said length of paper by said knife means switching the switch member to said open position to switch the knife go-switch to the no-go position and thereby cause the movable blade to return to the non-cutting position.

7. The reproduction apparatus of claim 6 wherein a window is disposed in the copy paper pathway between the input and output, and a high intensity lamp is used when reproducing the originial document onto said copy paper moving past said window, said second switch being positioned in the copy paper pathway between the input and the window, said second switch turning on said lamp when in said operative position; and
a "hold" switch is disposed in the copy paper pathway between the window and the output and having a light hold-position and a light off-position, the leading edge of the copy paper switching the "hold" switch to the light hold-position after said second switch is in the operative position, said "hold" switch returning to the light off-position to cause the lamp to turn off after the trailing edge of the copy paper has passed said "hold" switch.

8. The reproduction apparatus of claim 5, wherein:
a stationary blade is positioned adjacent the movable blade means, said stationary blade being disposed underneath the copy paper and the movable blade means is disposed above the copy paper prior to the severing of the length of copy paper;
a guide wall is positioned above the copy paper and the stationary blade;
an inclined guide member having a lower edge below the stationary blade, said guide member inclining upward from said lower edge toward the second feed rollers, the stationary blade, the guide wall and the inclined guide member cooperating to prevent the copy paper from straying from the desired pathway before the leading edge of the copy paper is gripped by the second feed rollers.

9. The reproduction apparatus of claim 8, wherein:
said movable blade means comprises a cradle having a pair of opposed ears at the opposite ends thereof, said gear member being associated with one of said ears, said cradle having an inclined surface inclining inwardly and away from the stationary blade from said one ear to the other ear, a knife mounted in the inclined surface whereby the distance from the copy paper to the knife being less adjacent said one ear than adjacent said other ear, the rotation of said gear causing a greater arcuate movement of the cradle and knife adjacent said other ear;
the first feed means and the second feed means each comprises a pair of cooperating rollers to receive the copy paper therebetween;
the knife "go" switch comprises a relay, said relay being energized when the first switch means is switched to the on-position, said relay providing electrical power for itself and for the knife solenoid when the first switch means returns to the off-position;
said power means comprises a continuous rotating chain, the said second feed means being coupled to and driven by said chain;
a sprocket is associated with a shaft of one of the rollers of the first feed means and caused to rotate by said chain; and
a clutch means couples the shaft of said one roller of the first feed means to said sprocket to drive the first feed rollers when said first switch means switches into the on-position, said clutch means dis-associates the shaft from the sprocket when the second switch means switches into the operative-position, thereby removing the power drive from the first feed means.

10. In a reproduction apparatus including a supply of copy paper, an original document transport system for transporting an original document through a pathway, a copy paper transport system for transporting copy paper through a second pathway, means for reproducing the original document onto said copy paper, the herein improvement comprising:
a first feed means for pulling the copy paper from the supply into said second pathway;
a second feed means to receive the copy paper from the first feed means;
a knife means positioned between the first and second feed means to cut a length of said copy paper from the supply;
power means for driving said first feed means and said second feed means, and
means for coupling said power means to said first feed means and means for decoupling said power means from said first feed means after said second feed means has received the copy paper and before said knife means has severed said length of copy paper, said second second feed means pulling the copy paper into the second pathway after the decoupling of said first feed means and the power means, said knife means being movable to a cutting position from a non-cutting position, said knife means providing a restraining force against the copy paper when moving toward said cutting position and preventing the second feed means from pulling more copy paper from the supply, whereby the cooperation of the pulling force from the second feed means and the restraining force from the knife means maintains the copy paper taut between the second feed means and the knife means prior to the severing of the length of copy paper from the supply.

References Cited

UNITED STATES PATENTS 3,218,918  11/1965  Brindley et al. _____ 355—28
3,289,532  12/1966  Baumgarten et al. _____ 355—28

NORTON ANSHER, Primary Examiner

R. A. WINTERCORN, Assistant Examiner

U.S. Cl. X.R.

95—89